(12) United States Patent
Singh

(10) Patent No.: US 10,329,828 B2
(45) Date of Patent: *Jun. 25, 2019

(54) SMART MANAGEMENT SYSTEM FOR GARAGE DOORS AND ELECTRONIC DEVICES

(71) Applicant: Harpal C Singh, Murphy, TX (US)

(72) Inventor: Harpal C Singh, Murphy, TX (US)

( * ) Notice: Subject to any disclaimer, the term of this patent is extended or adjusted under 35 U.S.C. 154(b) by 146 days.

This patent is subject to a terminal disclaimer.

(21) Appl. No.: 15/356,244

(22) Filed: Nov. 18, 2016

(65) Prior Publication Data
US 2018/0106092 A1     Apr. 19, 2018

Related U.S. Application Data

(63) Continuation-in-part of application No. 15/292,381, filed on Oct. 13, 2016.

(51) Int. Cl.
| | |
|---|---|
| *G06F 19/00* | (2018.01) |
| *E05F 15/73* | (2015.01) |
| *A01M 29/18* | (2011.01) |
| *G05B 11/01* | (2006.01) |
| *B05B 12/02* | (2006.01) |
| *B05B 12/12* | (2006.01) |
| *H04N 5/225* | (2006.01) |
| *E05F 15/71* | (2015.01) |
| *E05F 15/74* | (2015.01) |
| *E05F 15/77* | (2015.01) |

(52) U.S. Cl.
CPC ........... *E05F 15/73* (2015.01); *A01M 29/18* (2013.01); *B05B 12/02* (2013.01); *B05B 12/12* (2013.01); *E05F 15/71* (2015.01); *E05F 15/74* (2015.01); *E05F 15/77* (2015.01); *G05B 11/01* (2013.01); *H04N 5/2257* (2013.01); *E05F 2015/765* (2015.01); *E05F 2015/767* (2015.01); *E05Y 2900/106* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,278,970 A | * | 7/1981 | Streczyn | A61B 5/01 337/298 |
| 4,507,953 A | * | 4/1985 | Vandermeerssche | G01N 3/56 73/667 |

(Continued)

*Primary Examiner* — Kidest Bahta

(57) ABSTRACT

A smart management system for garage doors and electronic devices is a device that is utilized to manage and control electronic devices. The device includes a housing structure that is mountable to a surface such as a wall or a ceiling. A video capture device provides a live video feed of surrounding areas while at least one environmental sensor allows monitoring of various conditions in the surrounding areas. A wireless communication module allows the device to be associated with an external computing device while a plurality of electrical outlets enables various electronic devices to be connected to the device. A control unit enables the device to monitor and manage the electronic devices. The control unit is configured to monitor and regulate a garage door status by using data captured by the video capture device, the at least one environmental sensor, and the rangefinder.

18 Claims, 13 Drawing Sheets

(56) References Cited

U.S. PATENT DOCUMENTS

| | | | | |
|---|---|---|---|---|
| 5,282,337 | A * | 2/1994 | Duhame | E05F 15/668 160/188 |
| 5,596,840 | A * | 1/1997 | Teich | E05F 15/43 49/26 |
| 6,563,431 | B1 * | 5/2003 | Miller, Jr. | E04H 6/426 340/330 |
| 8,429,435 | B1 * | 4/2013 | Clayton | H04L 12/10 700/19 |
| 2002/0183008 | A1 * | 12/2002 | Menard | G07C 9/00182 455/66.1 |
| 2007/0208517 | A1 * | 9/2007 | Glenn | A01G 7/00 702/19 |
| 2009/0034369 | A1 * | 2/2009 | Hill | A01M 29/18 367/139 |
| 2009/0085754 | A1 * | 4/2009 | Myllymaki | F24C 15/2021 340/584 |
| 2009/0167537 | A1 * | 7/2009 | Feliss | B60L 3/0069 340/584 |
| 2009/0251832 | A1 * | 10/2009 | Brugner | H01R 13/6683 361/42 |
| 2012/0126978 | A1 * | 5/2012 | Kellen | G08B 5/36 340/541 |
| 2012/0211214 | A1 * | 8/2012 | Phan | H01L 23/3677 165/185 |
| 2014/0111320 | A1 * | 4/2014 | Holt | G07C 9/00309 340/12.24 |
| 2014/0160611 | A1 * | 6/2014 | Lam | H02H 5/047 361/106 |
| 2017/0141519 | A1 * | 5/2017 | Lu | H01R 13/6666 |
| 2017/0154482 | A1 * | 6/2017 | Osborne | G07C 9/00309 |

* cited by examiner

SMART MANAGEMENT SYSTEM FOR GARAGE DOORS AND ELECTRONIC DEVICES

FIELD OF THE INVENTION

The present invention relates generally to a smart control device. More specifically, the present invention is a smart management system for garage doors and electronic devices.

BACKGROUND OF THE INVENTION

Automated control systems are becoming increasingly popular for managing various aspects of buildings. These systems enable automation of various systems such as lighting, heating, ventilation, air conditioning (HVAC), and security. Automated control systems also enable automation of appliances such as washers and dryers, ovens, and refrigerators and freezers. A typical automated control system is controlled by a central hub to which systems and appliances are connected and is managed through a user interface. The user interface is generally accessed via a wall-mounted terminal, mobile phone software, a tablet computer, or a web interface. Automated control systems may be programmed to perform various functions without any management or input from the user. In addition, the user may manually input commands through the user interface to manage the various systems and appliances that are controlled by the automated control system.

The present invention is a smart management system for garage doors and electronic devices that enables automated management and control of garage doors and other electronic devices. The system is configured to monitor and regulate a garage door status using data captured from various sources. Various types of electronic devices may be managed or controlled by the system by physically connecting or wirelessly connecting the devices to the system.

DETAIL DESCRIPTIONS OF THE INVENTION

Figure 1:
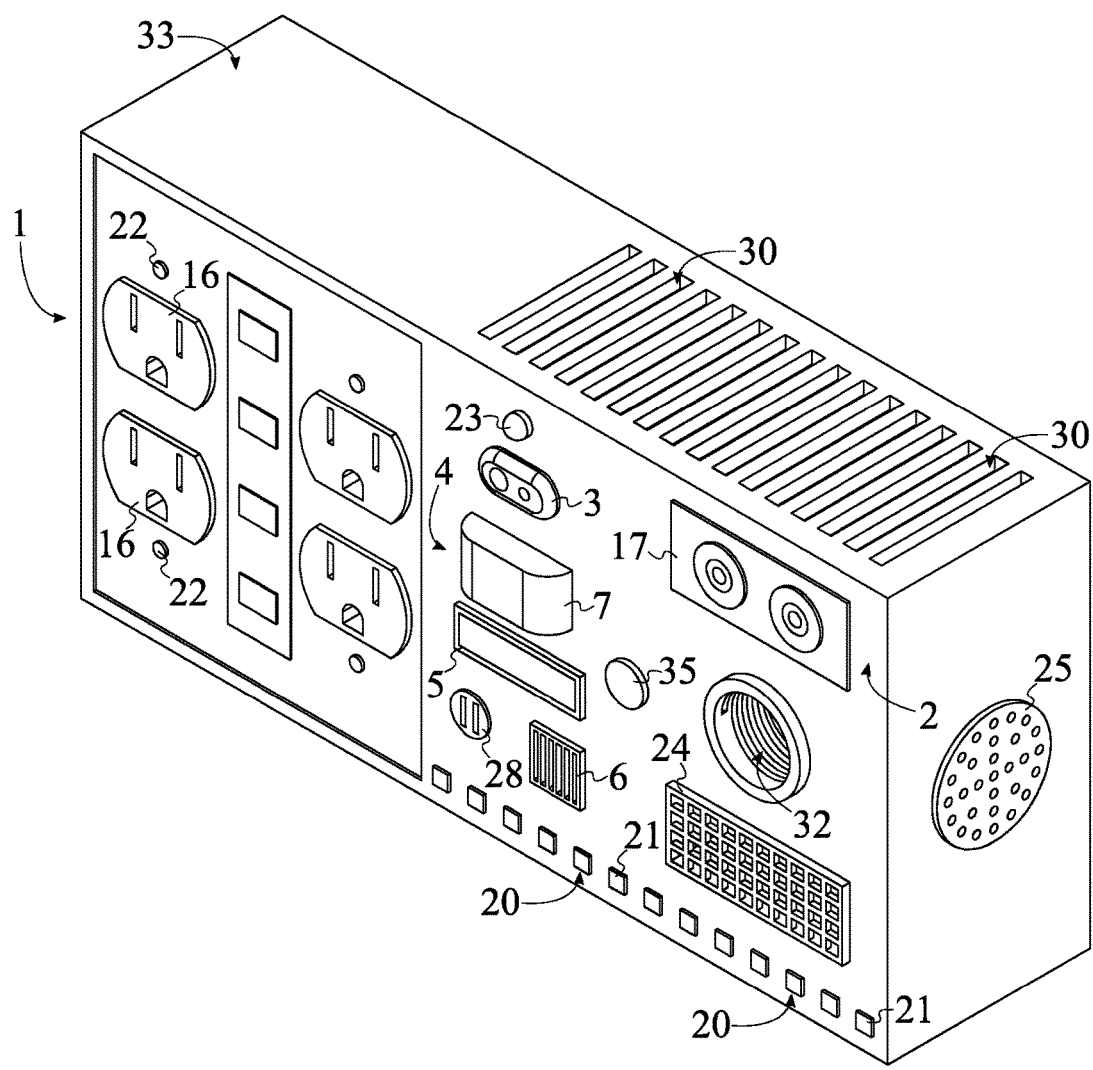
FIG. 1 is a perspective view of the present invention.

All illustrations of the drawings are for the purpose of describing selected versions of the present invention and are not intended to limit the scope of the present invention.

The present invention is a smart management system for garage doors and electronic devices. The present invention is shown in FIGS. 1-9 and comprises a housing structure 1, a video capture device 3, at least one environmental sensor 4, a wireless communication module 15, a plurality of electrical outlets 16, a rangefinder 17, and a control unit 18.

Figure 2:
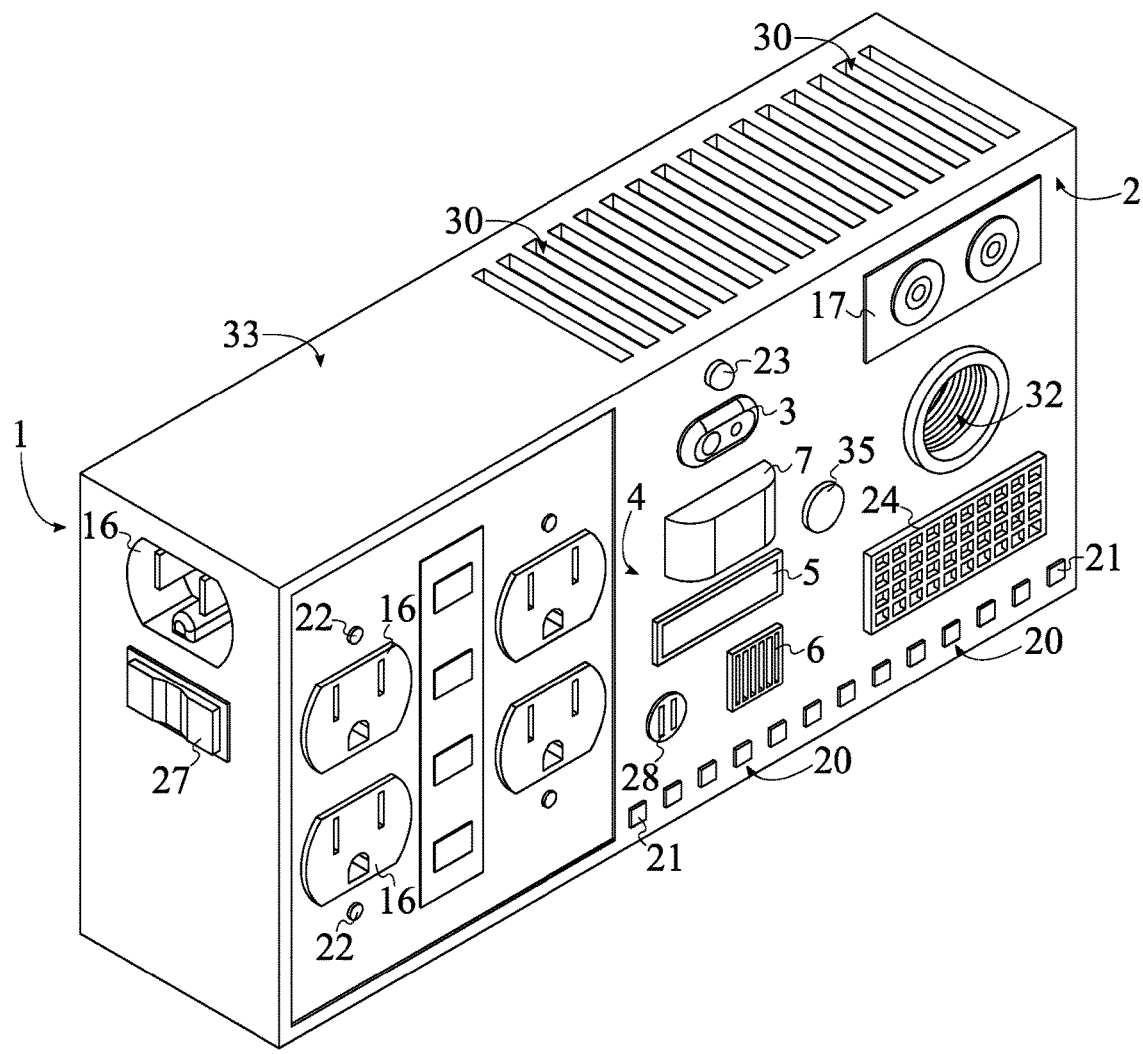
FIG. 2 is an additional perspective view of the present invention.
Figure 3:
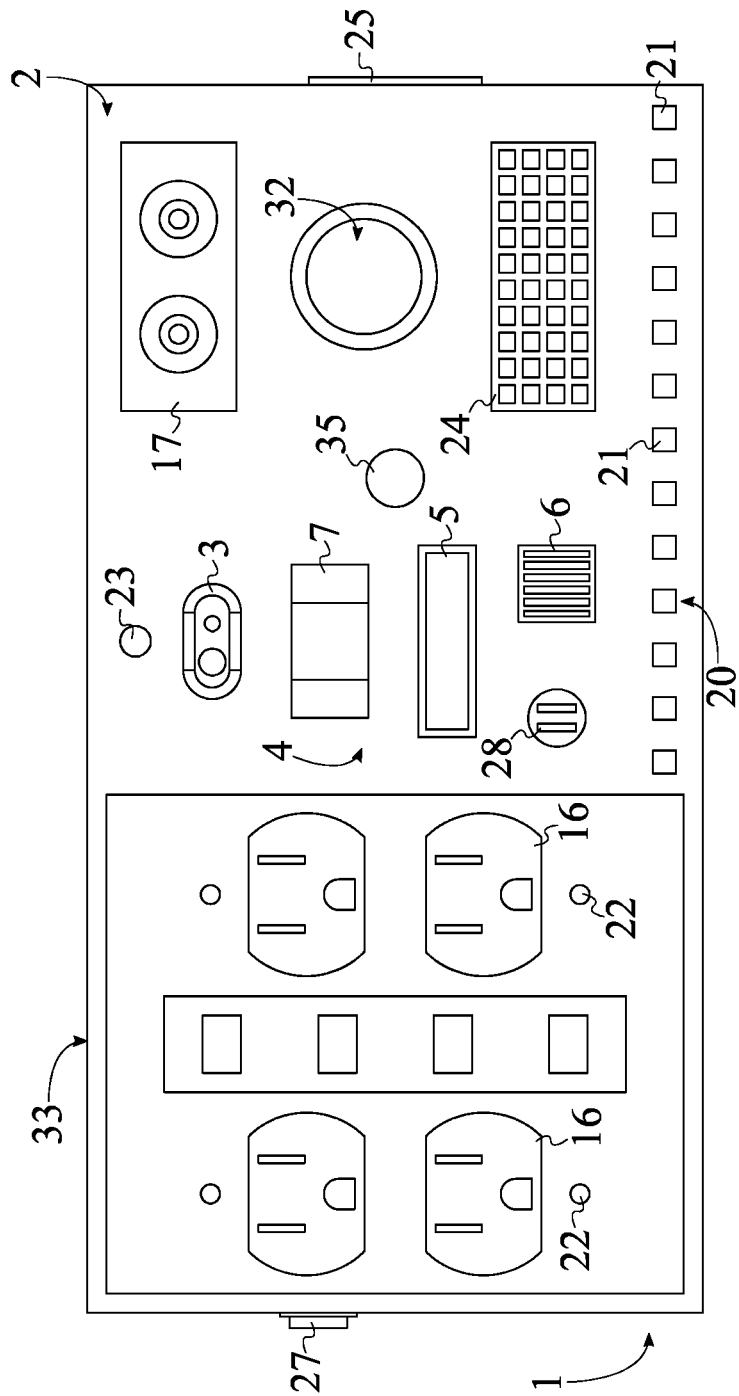
FIG. 3 is a front view of the present invention.

With reference to FIGS. 1-3, the housing structure 1 serves as a protective enclosure for the electronic and electrical components of the present invention. The housing structure 1 comprises a front surface 2 on which various components are positioned. The video capture device 3 is utilized to capture a live video feed of the surrounding areas of the present invention and is mounted into the front surface 2. The video capture device 3 is thus able to monitor the surrounding areas of the present invention when the present invention is mounted onto a surface such as a wall or ceiling. This allows the video capture device 3 to be utilized as a security camera.

The at least one environmental sensor 4 is utilized to monitor conditions in the surrounding areas of the present invention. The plurality of electrical outlets 16 enables electronic devices to be connected to and draw power from the present invention. Furthermore, the plurality of electrical outlets 16 enables the present invention to be connected to an electrical power source. The rangefinder 17 is primarily intended for use in determining if a garage door is open or closed by monitoring the distance from the present invention to the garage door. The at least one environmental sensor 4, the plurality of electrical outlets 16, and the rangefinder 17 are mounted into the housing structure 1. These components may be positioned on the front surface 2 or on other regions of the housing structure 1.

Figure 4:
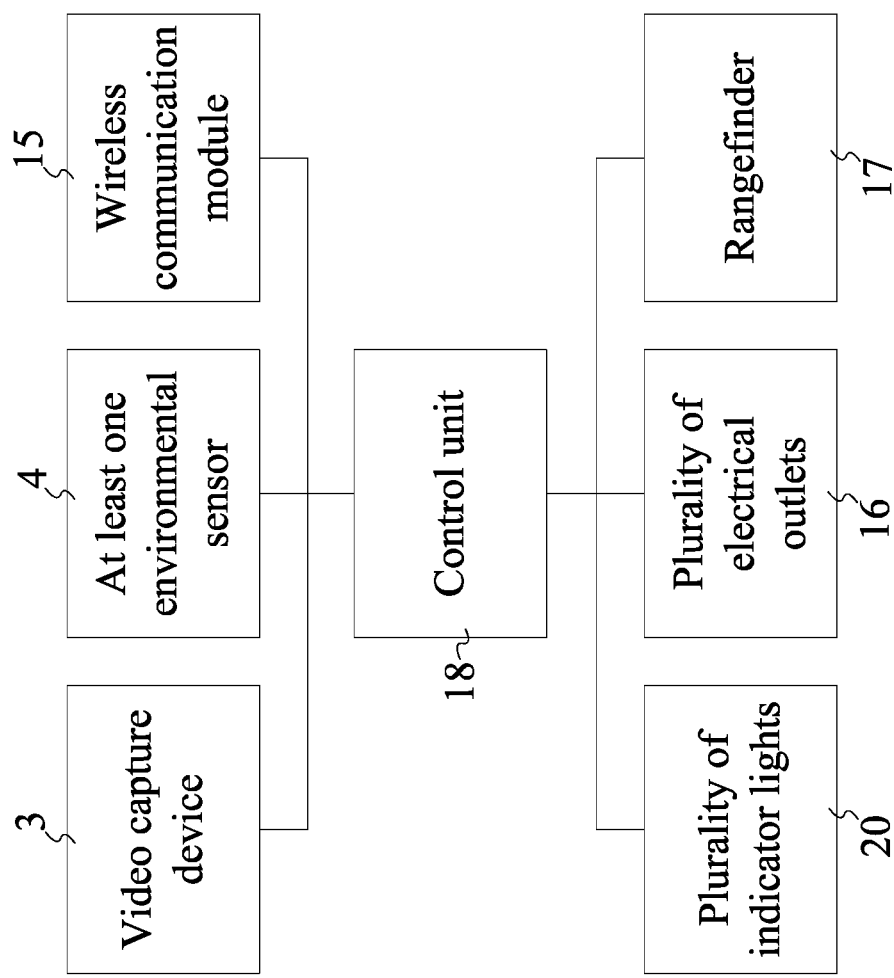
FIG. 4 is a diagram detailing electronic connections of the control unit.

With reference to FIG. 4, the control unit 18 monitors and regulates the electronic and electrical components of the present invention. The control unit 18 also processes and executes user inputted commands for the present invention. The wireless communication module 15 enables the present invention to be synced and associated with an external computing device such as a smartphone, tablet computer, or desktop computer. Additionally, the wireless communication module 15 enables two-way communication between the present invention and the external computing device, allowing the user to monitor and program the behavior of the present invention. The video capture device 3, the at least one environmental sensor 4, the wireless communication module 15, the plurality of electrical outlets 16, and the rangefinder 17 are electronically connected to the control unit 18, enabling the control unit 18 to monitor and regulate these components of the present invention. The control unit 18 is able to activate and deactivate each of the plurality of electrical outlets 16 independently of each other. As a result, the control unit 18 is able to electrically connect or disconnect any electronic device that is connected to the present invention through the plurality of electrical outlets 16. For example, the present invention may activate Christmas lights during nighttime and deactivate the Christmas lights during daytime.

In the preferred embodiment of the present invention, the control unit 18 is configured to monitor and regulate a garage door status using data captured by the video capture device 3, the at least one environmental sensor 4, and the rangefinder 17. More specifically, the video capture device 3 is utilized to monitor the open or closed status of a garage door as the user is able to view the garage door directly through the live video feed provided by the video capture device 3. The at least one environmental sensor 4 is able to monitor conditions within a garage that may be indicative of an open or closed garage door. Finally, the rangefinder 17 is utilized to directly monitor the distance between the present invention and the garage door. In the preferred embodiment of the present invention, the control unit 18 is able to automatically open or close a garage door. Additionally, the wireless communication module 15 enables the control unit 18 to receive and process remote user inputted commands in order to open or close the garage door.

The control unit 18 is also configured to calculate a sprinkler schedule for the plurality of electrical outlets 16 using data retrieved through the wireless communication module 15. More specifically, the present invention is able to receive weather data from an external source such as a weather application program interface (API) through the wireless communication module 15. In order to receive accurate weather data, the user is able to input the location of the present invention in order to retrieve weather data for the location. This may be accomplished by inputting the zip code of the location. The present invention is able to calculate a sprinkler schedule according to the received weather data. For example, if precipitation is forecasted, the control unit 18 may disable or delay the activation of the sprinklers in order to avoid wasting water. In addition to the weather data, the control unit 18 may take into account additional factors such as outdoor temperature and time of day when calculating a sprinkler schedule. The control unit 18 is able to process the weather data and other relevant data in order to implement a sprinkler schedule by regulating the behavior of sprinklers that are connected to the present invention through the plurality of electrical outlets 16. The control unit 18 is additionally able to regulate the behavior of sprinklers that are wirelessly connected to the present invention as well.

Figure 5:
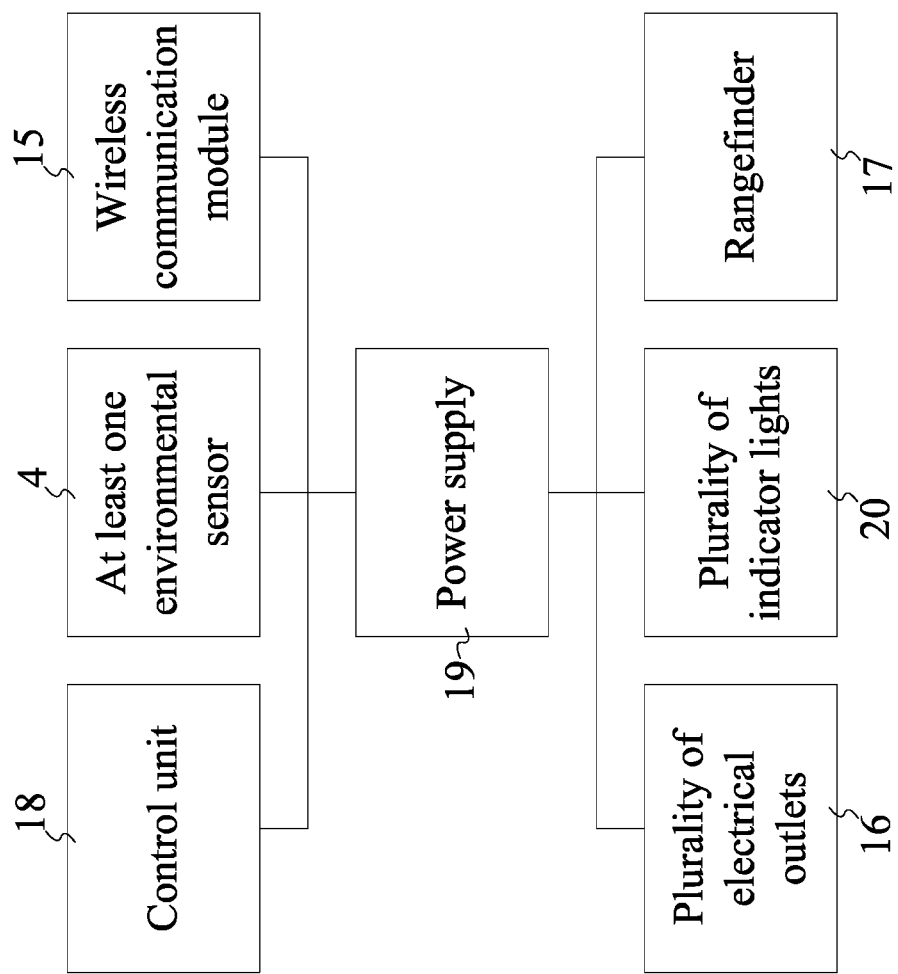
FIG. 5 is a diagram detailing electronic connections of the power supply.

With reference to FIG. 5, the present invention further comprises a power supply 19 that provides electrical power to the electronic components of the present invention. The power supply 19 may be connected to an external electrical power source through the plurality of electrical outlets 16 in order to draw power from the external electrical power source. Alternatively, the power supply 19 may be a rechargeable or removable battery. The power supply 19 is electrically connected to the video capture device 3, the at least one environmental sensor 4, the wireless communication module 15, the plurality of electrical outlets 16, the rangefinder 17, and the control unit 18, allowing the power supply 19 to provide electrical power to these components of the present invention. In addition to the aforementioned components, the power supply 19 may provide electrical power to additional electronic components of the present invention.

The present invention further comprises a plurality of indicator lights 20. The plurality of indicator lights 20 provides a visual indicator for the status of various properties of the present invention. The plurality of indicator lights 20 is mounted into the housing structure 1, allowing the plurality of indicator lights 20 to be easily visible by the user. Additionally, with reference to FIG. 5, the plurality of indicator lights 20 is electronically connected to the control unit 18. The control unit 18 is thus able to regulate the behavior of the plurality of indicator lights 20.

With reference to FIGS. 1-3, the at least one environmental sensor 4 may be a light sensor 5. The light sensor 5 enables the present invention to determine if a light source is present in the surrounding areas of the present invention. For example, the light source is able to determine if a light has been unintentionally left on inside a garage. The at least one environmental sensor 4 may also be a humidity sensor 6. The humidity sensor 6 enables the present invention to monitor the humidity level of the surrounding areas of the present invention.

Figure 6:
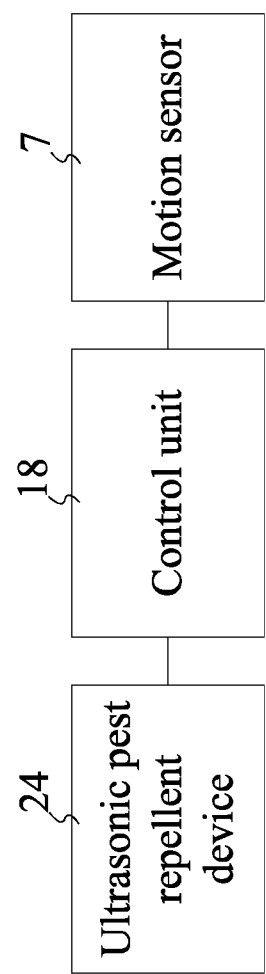
FIG. 6 is a diagram detailing electronic connections of the ultrasonic pest repellent device.

The present invention further comprises an ultrasonic pest repellent device 24. The ultrasonic pest repellent device 24 is utilized to repel pests such as mice, spiders, rats, ants, and roaches. The ultrasonic pest repellent device 24 utilizes ultrasonic sound waves and electromagnetic waves to repel pests in lieu of potentially harmful chemicals. The ultrasonic pest repellent device 24 is preferably positioned on the front surface 2, enabling the ultrasonic pest repellent device 24 to repel pests in front of the present invention when the present invention is mounted onto a surface such as a wall or ceiling. The ultrasonic pest repellent device 24 is electronically connected to the control unit 18, allowing the control unit 18 to manage and regulate the ultrasonic pest repellent device 24. The at least one environmental sensor 4 comprises a motion sensor 7 that is utilized in conjunction with the ultrasonic pest repellent device 24. The motion sensor 7 enables automated activation of the ultrasonic pest repellent device 24 upon detection of movement. The motion sensor 7 is positioned on the front surface 2, allowing the motion sensor 7 to detect movement in front of the present invention. As shown in FIG. 6, the motion sensor 7 is operably coupled to the ultrasonic pest repellent device 24 through the control unit 18, allowing the control unit 18 to activate the ultrasonic pest repellent device 24 when movement is detected in the surrounding areas by the motion sensor 7. However, the motion sensor 7 and/or the ultrasonic pest repellent device 24 may be temporarily deactivated in order to prevent unintended activation (for example, if the user moves in front of the present invention).

Figure 7:
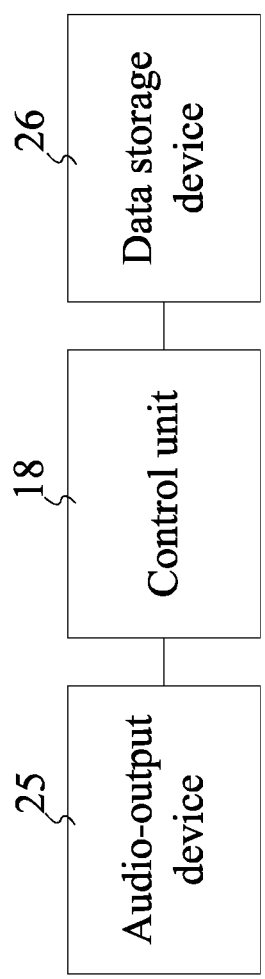
FIG. 7 is a diagram detailing electronic connections of the audio-output device.

The present invention further comprises an audio-output device 25. The audio-output device 25 is utilized to play sounds, songs, and other audio media through the present invention. The audio-output device 25 is externally positioned on the housing structure 1, enabling the audio-output device 25 to project audio to the surrounding areas of the present invention. The audio-output device 25 is electronically connected to the control unit 18 as shown in FIG. 7, enabling the control unit 18 to manage and regulate the behavior of the audio-output device 25. The present invention further comprises a data storage device 26 that is utilized to store one or more audio files that are playable through the audio-output device 25. The data storage device 26 is electronically connected to the audio-output device 25 through the control unit 18. The control unit 18 is thus able to select audio files that are stored on the data storage device 26 to be played through the audio-output device 25.

With further reference to FIG. 1-3, the plurality of indicator lights 20 comprises a plurality of sprinkler zone status lights 21. The plurality of sprinkler zone status lights 21 is utilized to monitor sprinklers that are located throughout multiple zones. For example, a light from the plurality of sprinkler zone status lights 21 may be green if the sprinkler in the corresponding zone is active. However, if the sprinkler is inactive, the light may be red. The plurality of sprinkler zone status lights 21 is linearly distributed on the front surface 2, allowing the user to easily assess the plurality of sprinkler zone status lights 21.

The control unit 18 is able to simultaneously activate all sprinklers in all sprinkler zones in order to test the functionality of the sprinklers.

The plurality of indicator lights 20 further comprises a plurality of outlet status lights 22. The plurality of outlet status lights 22 provides a visual indicator of the status of the plurality of electrical outlets 16. An arbitrary light from the plurality of outlet status lights 22 is positioned adjacent to a corresponding outlet from the plurality of electrical outlets 16. The arbitrary light serves as an indicator of the power status of the corresponding outlet. For example, if the corresponding outlet is powered, the arbitrary light may be green. Alternatively, if the corresponding outlet is unpowered, the arbitrary light may be red.

The plurality of indicator lights 20 further comprises an overheating indicator light 23. The overheating indicator light 23 is utilized to determine if the control unit 18 is overheating or has reached an unsafe temperature during operation of the present invention. The overheating indicator light 23 is positioned on the front surface 2 for convenient visual assessment of the temperature of the control unit 18.

Figure 8:
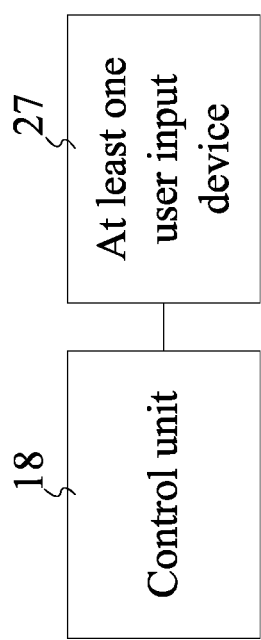
FIG. 8 is a diagram detailing electronic connections of the at least one user input device.

The present invention further comprises at least one user input device 27. The at least one user input device 27 is utilized to turn the present invention on or off and is also utilized to input user commands to the present invention. The at least one user input device 27 is operably disposed on the housing structure 1, enabling the user to easily access and use the at least one user input device 27. As shown in FIG. 8, the at least one user input device 27 is electronically connected to the control unit 18. The user's commands through the at least one user input device 27 are thus processed and implemented by the control unit 18.

Figure 9:
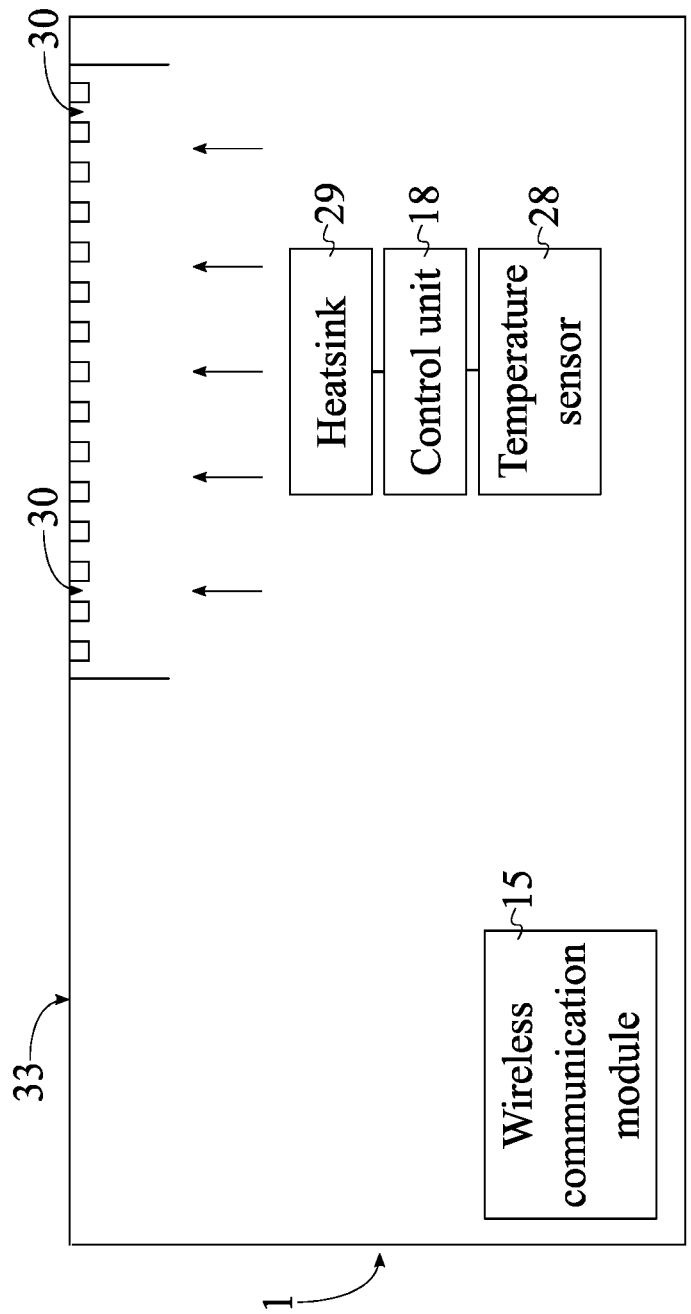
FIG. 9 is a diagram detailing the positioning of the heatsink, the control unit, the temperature sensor, and the wireless communication module within the housing structure.

The present invention further comprises a temperature sensor 28 and a heatsink 29 as shown in FIG. 9. The temperature sensor 28 is able to detect the temperature of the control unit 18 while the heatsink 29 is utilized to transfer heat generated from the control unit 18 away for dissipation. The temperature sensor 28 and the heatsink 29 are thermally coupled to the control unit 18, enabling the temperature sensor 28 to detect the temperature of the control unit 18 and allowing heat from the control unit 18 to be transferred to the heatsink 29. The temperature sensor 28 is operably coupled to the heatsink 29 through the control unit 18, allowing the temperature of the control unit 18 to be monitored and allowing the control unit 18 to receive data from the temperature sensor 28. The temperature sensor 28 and the heatsink 29 are positioned within the housing structure 1 along with the control unit 18.

The present invention further comprises at least one heat vent 30 through which heat transferred from the control unit 18 to the heatsink 29 to be dissipated to the surrounding areas of the present invention. The at least one heat vent 30 traverses into a lateral surface 33 of the housing structure 1, adjacent to the heatsink 29, forming an opening in the housing structure 1. Heat transferred to the heatsink 29 from the control unit 18 may thus exit from within the housing structure 1 through the at least one heat vent 30.

Figure 10:
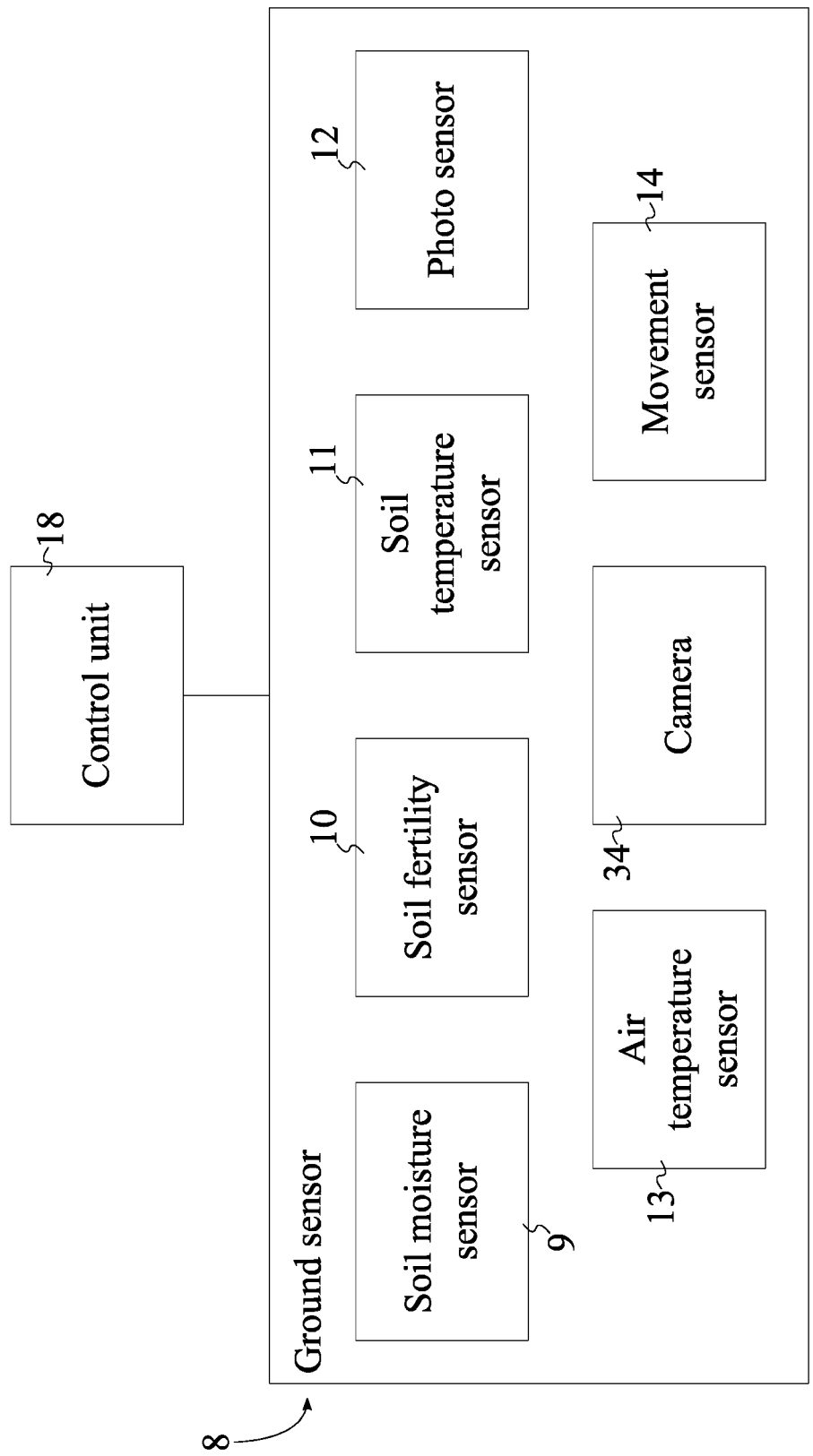
FIG. 10 is a diagram detailing electronic connections of the ground sensor.
Figure 11:
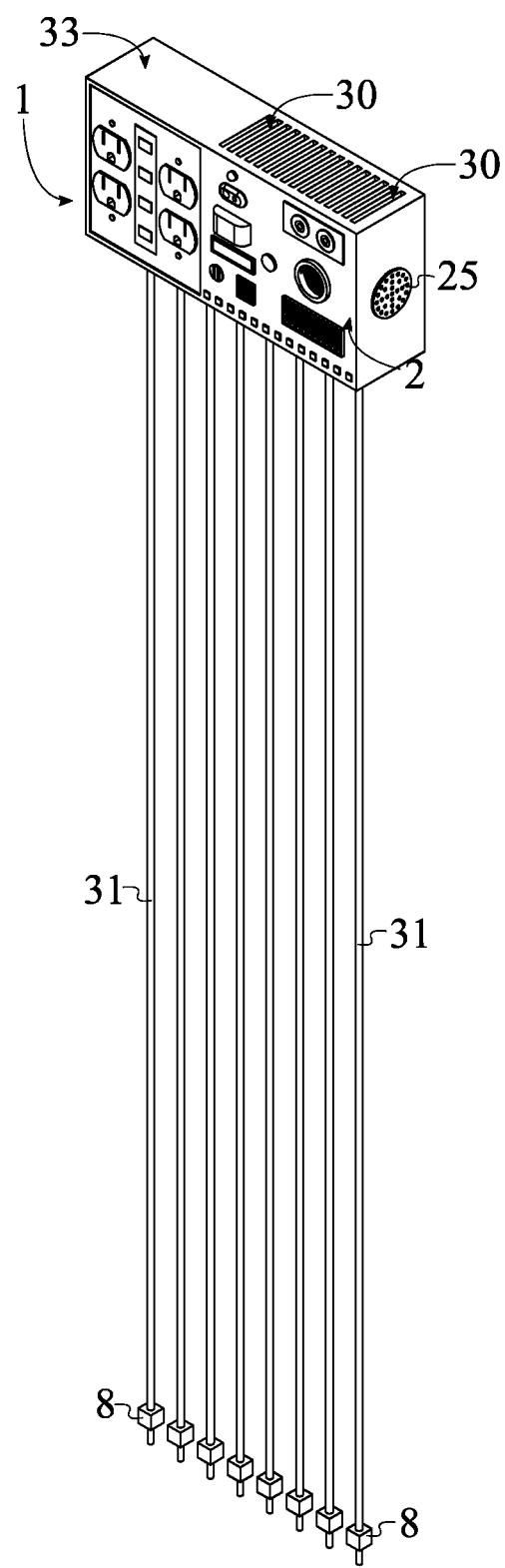
FIG. 11 is a perspective view of an embodiment of the present invention with the ground sensor and the tether.

In the embodiment of the present invention shown in FIG. 10 and FIG. 11, the at least one environmental sensor 4 further comprises a ground sensor 8. The ground sensor 8 monitors and measures various properties of soil. The ground sensor 8 is electronically connected to the control unit 18, allowing the control unit 18 to receive and process data received from the ground sensor 8. The ground sensor 8 includes a soil moisture sensor 9, a soil fertility sensor 10, a soil temperature sensor 11, a photo sensor 12, an air temperature sensor 13, a camera 34, and a movement sensor 14. The present invention is thus able to monitor and measure soil moisture, fertilizer absorption by plants, soil temperature, and light intensity on plants. The ground sensor 8 may be wirelessly connected to the control unit 18. However, as shown in FIG. 11, the present invention may further comprise a tether 31 that is utilized to connect the ground sensor 8 to the housing structure 1, allowing the ground sensor 8 to draw electrical power through the tether 31.

Figure 12:
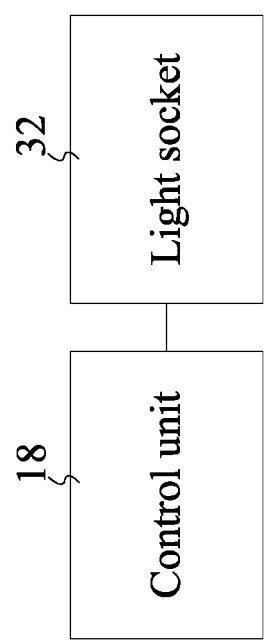
FIG. 12 is a diagram detailing electronic connections of the light socket.
Figure 13:
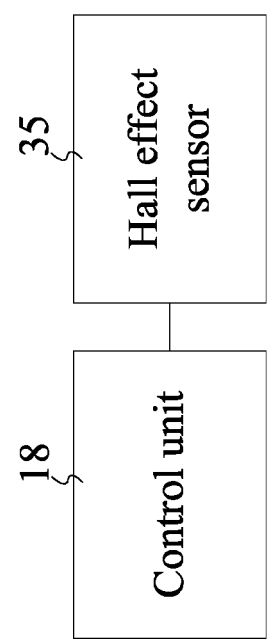
FIG. 13 is a diagram detailing electronic connections of the Hall effect sensor.

Again with reference to FIGS. 1-3 and with reference to FIG. 12, the present invention further comprises a light socket 32. The light socket 32 enables a lightbulb to be attached to and draw power from the present invention. The light socket 32 traverses into the housing structure 1, forming an opening into which a lightbulb may be inserted and secured. The light socket 32 is electronically connected to the control unit 18, enabling the control unit 18 to regulate the behavior of the lightbulb.

The present invention further comprises a Hall effect sensor 35 as shown in FIGS. 1-3 and FIG. 13. The Hall effect sensor 35 is utilized to detect the presence and positioning of magnetic objects within the surrounding areas of the present invention. Within the context of the present invention, the Hall effect sensor 35 may be utilized to detect the presence of a vehicle that is parked within a garage. The Hall effect sensor 35 is positioned on the front surface 2, enabling the Hall effect sensor 35 to detect the presence of a vehicle or other magnetic object in front of the present invention when the present invention is mounted onto a surface such as a wall or ceiling. The Hall effect sensor 35 is electronically connected to the control unit 18, allowing the control unit 18 to receive and process data received from the Hall effect sensor 35.

Although the present invention has been explained in relation to its preferred embodiment, it is understood that many other possible modifications and variations can be made without departing from the spirit and scope of the present invention as hereinafter claimed.

What is claimed is:

1. A smart management system comprising:
a housing structure;
a video capture device;
at least one environmental sensor;
a wireless communication module;
a plurality of electrical outlets;
a rangefinder;
a control unit;
a plurality of indicator lights;
a heatsink;
a Hall effect sensor;
the video capture device, the least one environmental sensor, the wireless communication module, the plurality of electrical outlets, the rangefinder, the control unit, the plurality of indicator lights, the heatsink and the Hall effect sensor being configured to be used for electronic devices;
the housing structure comprising a front surface;
the video-capture device being mounted to the front surface;
the at least one environmental sensor, the plurality of electrical outlets, the rangefinder and the plurality of indicator lights being mounted to the housing structure;
the Hall effect sensor, the video capture device, the at least one environmental sensor, the wireless communication module, the plurality of electrical outlets, the rangefinder and the plurality of indicator lights being electronically connected to the control unit;
the plurality of indicator lights comprising an overheating indicator light;

the Hall effect sensor being positioned on the front surface;
the Hall effect sensor being utilized to detect a presence of a magnetic object within surrounding areas of the smart management system;
the overheating indicator light being positioned on the front surface;
the overheating indicator light being configured to determine if the control unit is overheating during operation of the smart management system;
the heatsink being thermally coupled to the control unit;
the heatsink being positioned within the housing structure;
the heatsink being utilized to transfer heat generated from the control unit away for dissipation;
the at least one environmental sensor comprising a ground sensor;
the ground sensor comprising a soil fertility sensor;
the soil fertility sensor being utilized to monitor and measure fertilizer absorption by plants;
at least one heat vent;
the at least one heat vent traversing into a lateral surface of the housing structure; and
the at least one heat vent being adjacently located to the heatsink.

2. The smart management system as claimed in claim 1, wherein the control unit is configured to calculate a sprinkler schedule for the plurality of electrical outlets using data retrieved through the wireless communication module.

3. The smart management system as claimed in claim 1 comprising:
a power supply; and
the power supply being electrically connected to the video capture device, the at least one environmental sensor, the wireless communication module, the plurality of electrical outlets, the rangefinder and the control unit.

4. The smart management system as claimed in claim 1, wherein the at least one environmental sensor comprises a light sensor.

5. The smart management system as claimed in claim 1, wherein the at least one environmental sensor comprises a humidity sensor.

6. The smart management system as claimed in claim 1 comprising:
an ultrasonic pest repellent device;
the ultrasonic pest repellent device being positioned on the front surface; and
the ultrasonic pest repellent device being electronically connected to the control unit.

7. The smart management system as claimed in claim 6 comprising:
the at least one environmental sensor comprising a motion sensor;
the motion sensor being positioned on the front surface; and
the motion sensor being operably coupled to the ultrasonic pest repellent device through the control unit.

8. The smart management system as claimed in claim 1 comprising:
an audio-output device;
the audio-output device being externally positioned on the housing structure; and
the audio-output device being electronically connected to the control unit.

9. The smart management system as claimed in claim 8 comprising:
a data storage device; and
the data storage device being electronically connected to the audio-output device through the control unit.

10. The smart management system as claimed in claim 1 comprising:
the plurality of indicator lights comprising a plurality of sprinkler zone status lights; and
the plurality of sprinkler zone status lights being linearly distributed on the front surface.

11. The smart management system as claimed in claim 1 comprising:
the plurality of indicator lights comprising a plurality of outlet status lights; and
an arbitrary light from the plurality of outlet status lights being positioned adjacent to a corresponding outlet from the plurality of electrical outlets.

12. The smart management system as claimed in claim 1 comprising:
at least one user input device;
the at least one user input device being operably disposed on the housing structure; and
the at least one user input device being electronically connected to the control unit.

13. The smart management system as claimed in claim 1 comprising:
a temperature sensor;
the temperature sensor being thermally coupled to the control unit;
the temperature sensor being operably coupled to the heatsink through the control unit; and
the temperature sensor being positioned within the housing structure.

14. The smart management system as claimed in claim 1 comprising:
the ground sensor being electronically connected to the control unit.

15. The smart electronic device management system as claimed in claim 1, wherein the ground sensor comprises a soil moisture sensor, a soil temperature sensor, a photo sensor, an air temperature sensor, a camera and a movement sensor.

16. The smart management system as claimed in claim 1 comprising:
a tether; and
the ground sensor being connected to the housing structure through the tether.

17. The smart management system as claimed in claim 1 comprising:
a light socket;
the light socket traversing into the housing structure; and
the light socket being electronically connected to the control unit.

18. The smart management system as claimed in claim 1 comprising:
the video capture device being configured to monitor an open status and a closed status of a garage door;
the at least one environmental sensor being configured to monitor conditions within a garage;
the wireless communication module being configured to enable the control unit to receive and process remote user inputted command;
the rangefinder being configured to monitor a distance between the smart management system and the garage door; and
the control unit being configured to automatically open or close the garage door.

* * * * *